Figure 1:
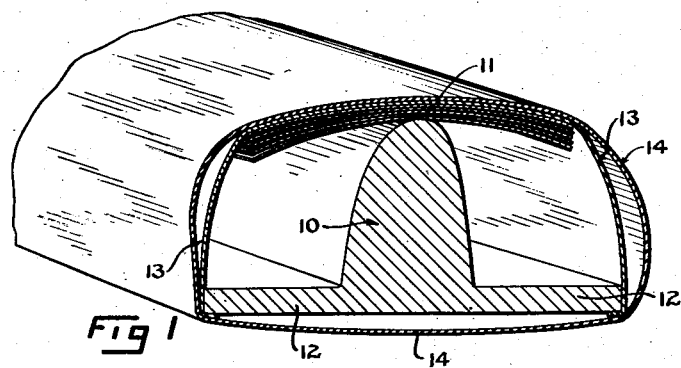

Feb. 29, 1944. E. L. VIDAL 2,342,988

METHOD OF FORMING LAMINATED MOLDED STRUCTURES

Filed Aug. 14, 1941

INVENTOR
E. L. Vidal
BY
Morgan, Finnegan & Durham
ATTORNEYS

Patented Feb. 29, 1944

2,342,988

UNITED STATES PATENT OFFICE

2,342,988

METHOD OF FORMING LAMINATED MOLDED STRUCTURES

Eugene L. Vidal, Rye, N. Y., assignor to Vidal Corporation, a corporation of Delaware Application August 14, 1941, Serial No. 406,756

2 Claims. (Cl. 144—309)

This invention relates to methods and apparatus for molding laminated structures from sheet material.

The invention is directed to providing novel and improved methods and means for molding articles from laminated sheet material, especially wood veneer, by the action of fluid pressure acting to mold the sheets of veneer and to bond the same together with plastic bonding material. The present invention is particularly directed to the molding of structures having relatively short-radius convex curvatures, especially where the radius of curvature is so small that the wood veneer is subjected to severe bending and consequent strains which would normally rupture the fibres of that normally frangible material. In the past difficulty has been encountered in so molding convexly curved veneer structures where the curvature is relatively sharp at a particular part of the article, especially where the curvature is substantially less elsewhere, thus presenting a relatively small area having a short radius of curvature which leads into much larger areas all having flat surfaces or surfaces of relatively long radius curvature. Many such structures are encountered in airplane parts, the leading edge of a wing or of a fin being typical.

In molding sheets of wood veneer to form such curved structures, it is customary to bend and position the laminae loosely about a mold having the interior shape of the part to be molded. The mold and laminae are then subjected to the molding action of external fluid pressure by encasing same in a flexible container, preferably vented to the atmosphere, and then applying fluid pressure to the exterior of the container whereby a substantially uniform pressure is applied substantially normal to all areas of the surfaces to be molded. The molding of the veneer takes place in conjunction with the plasticizing action thereon of bonding resins or the like, preferably of the thermoplastic type, so that under the combined actions of heat and fluid pressure the sheets of wood veneer are caused to be molded and bonded in the desired structural shape. Typical molding operations, as described, are fully disclosed in the prior copending application of applicant and Laurence J. Marhoefer, Serial No. 216,704, filed June 30, 1938, now Patent Number 2,276,004, granted March 10, 1942.

In so molding structures having the variable curvatures described above, it has been found that the area having the sharpest curvature is frequently not effectively bonded and shaped. This difficulty is prevalent whenever the areas which are substantially flat or of relatively long radius curvature substantially exceed the area of short radius curvature, as in the aircraft structures referred to. In molding the leading edges of such airfoils, it frequently happens that the veneer at the leading edge buckles or creeps away from the mold during the application of the fluid pressure so that wrinkles, insufficient bonding, weakening or even breakage of the veneer will occur at the section of maximum curvature. I have discovered that these undesirable effects are apparently due to the simultaneous application of uniform fluid pressures to the surface of the entire structure. The aggregate pressures on the relatively large flat areas are so much greater than that over the area of sharp curvature that the tendency of the veneer is not to conform accurately to the curved edge, leaving some play so that it may buckle in that direction, with the attendant undesirable results hereinabove referred to.

I have discovered that these undesirable effects can be overcome and a proper molding operation of such variable curvature surfaces accomplished by a novel method of differentially applying the fluidic molding pressure. That is, according to my invention, I first apply the maximum fluidic pressure along the line or edge of maximum curvature, while preventing the full pressure from simultaneously reaching the other areas of the material. By the novel means hereinafter disclosed, I am able to cause said maximum pressure to travel gradually from the nose or maximum curvature areas of the article along the areas of lesser curvature and toward the trailing edges of the article, until finally the entire article is subjected to the substantially complete maximum fluid pressure. By so applying pressure I cause the molding of the article to take place in a progressive manner and substantially in accordance with the diminution of curvature of the mold. This results in what is virtually a smoothing or wiping action effecting gradual bending and molding of the veneer sheets so that the tendency for the resultant lines of force is to travel away from the sharply curved leading edge and gradually increasingly toward the rear edges thereby first fixing and molding the laminae at the leading edge and absolutely preventing any possibility of buckling by permitting sliding away from the sharp radius area.

The foregoing molding operation is preferably employed utilizing a secondary elastic membrane within the flexible bag hereinbefore referred to. By causing the fluid pressure first to overcome the elastic resistance of said membrane in the areas where relatively low pressure is desired at the start, I am able to control the gradual application and increase of pressure in said area as desired.

It will be understood that the foregoing general description and the following detailed description as well are exemplary and explanatory but are not restrictive of the invention.

Figure 2:
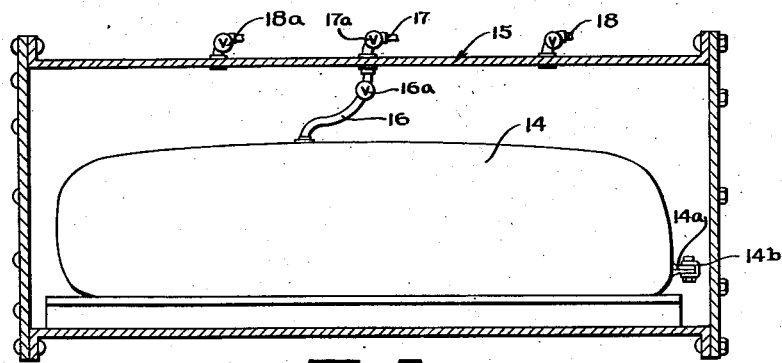
Figure 3:
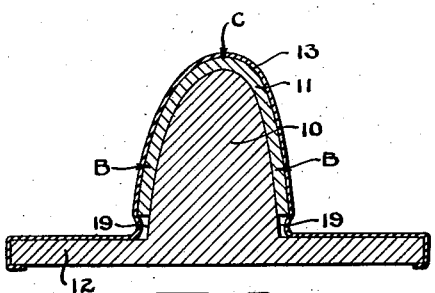

In the drawing, wherein like reference characters refer to like parts throughout the several views, Fig. 1 is a perspective view, with parts broken away, of one apparatus for carrying out the present invention;

Fig. 2 is a somewhat diagrammatic view, partly in side elevation and partly in section, of the above apparatus contained in a pressure tank; and Fig. 3 is a transverse sectional view of the moldable material and pressure transmitting member of Figs. 1 and 2, showing the effect thereon of the pressure application, the pressure applying means, for purpose of clarity, not being shown in this view.

The invention is illustrated, by way of example, as embodied in a process and apparatus for molding laminated structures on a removable mold from sheets of adhesively treated wood veneer. The adhesive may be a thermoplastic, such as polyvinyl butyral, in which case heat is applied during the molding, or a thermo-setting adhesive, such as urea formaldehyde, which can be set with or without heat. The thickness of the veneer and the number of laminations thereof depend on the amount of curvature or angularity to be imparted thereto and on the desired strength of the structure being fabricated therefrom. Pressures between 15 lbs. per sq. in. and 90 lbs. per sq. in., and temperatures varying from 170° F. to 260° F. are satisfactory for molding a structure with veneer when the latter is treated with polyvinyl butyral, pressures of approximately 60 lbs. per sq. in. and temperatures of approximately 240° F. usually producing best results.

The form upon which the veneer is shaped comprises, as shown, a removable mold 10 having the convex curved contour of the interior of the leading edge of a wing, that is, a curvature typical and illustrative of the molding problem solved by the invention. As will be seen, the convex edge of the mold 10 is of a relatively short radius curvature forming the sharply curved nose area "C," while the sides of the mold are very slightly curved and approach a flat surface toward the bottom or trailing edges, so that said relatively flat surfaces form areas "B" which are relatively much more extensive than the sharply curved nose portion "C." A plurality of adhesively treated veneer sheets 11 are positioned on the mold, being located to engage the uppermost area of the mold surface, i. e., the relatively small area of the mold which has the maximum curvature, the sheets extending somewhat tangentially in a lateral direction or diagonally on both sides of the mold.

It is to be noted that no attempt need be made at this stage of the fabrication to mechanically bend the sheets or to secure the latter to the mold, although it may sometimes be desirable to temporarily clamp or nail the sheets to the mold along the area of their first engagement with the mold. The latter step is for the purpose of fixing the sheets against displacement while the mold is being positioned in the apparatus for carrying out the molding operation.

After the sheets have been located on the mold, the mold assembly is operatively positioned with respect to a novel pressure transmitting means for effecting the differential application of pressures, as more fully described hereafter, and the latter is subjected to a uniform pressure which is transmitted thereby to the sheets to press the latter to the mold shape. In the illustrated embodiment, the means for applying uniform external fluid pressure comprise a flexible substantially impervious container or bag 14 and a fluid-tight pressure tank 15 (Fig. 2), said container having a conduit 16 connecting the interior thereof with a passage 17 in said tank. A valve 16a is provided in said passage to control the communication between the said container interior and the tank exterior. Bag 14 has an opening 14a in one end thereof for receiving the pressure transmitting means together with mold 10 and moldable material 11, said opening being provided with closure means 14b. A valve-controlled conduit 18 connects the tank interior to a pump, boiler or other source of high pressure fluid, the latter being preferably steam, air or water. If heat is required to activate the adhesive or to expedite the activation thereof, the same may be provided in any well-known manner as by introducing a separate heating medium into the tank through a passage 18a or by heating the pressure applying medium before or after it is admitted into the tank.

In order to cause sheets 11 to engage the mold smoothly without bulging or becoming separated as hereinbefore described, it is proposed to transmit a varying pressure to said sheets during the shaping and molding thereof, the pressure initially being so applied as to be a maximum at the relatively small area of maximum convex angularity or curvature of the mold. The novel pressure transmitting and controlling means comprise, as shown, a rigid base member 12, preferably formed integrally with mold 10, said base member being adapted to project laterally a substantial distance beyond the edges of the mold. A flexible member 13 which is preferably formed from an elastic sheet material, such as rubber or rubber composition, is detachably secured at its edges to base 12 in any well-known manner so as to encompass the laminations and the mold. To produce the desired pressure distribution during and after the bending of laminations 11, sheet 13 is of such a size that the area thereof free to engage the exposed surface of moldable material 11, mold 10 and base member 12 when the moldable material is in engagement with the mold, is less than the aggregate surface area of the latter parts available for covering. This difference between the area of said sheet and the area available for covering by said sheet is preferably such that when the laminations are closely pressed upon the mold, sheet 13 tends to bridge the gaps or spaces 19 (Fig. 3) on both sides of the mold between the edges of the laminations and the top surface of base member 12. The thickness of sheet 13 will be calibrated in accordance with the pressures to be used and the resistance thereto which it is desired to obtain from the stretch, that is, tensioning of the sheet 13, which in turn will depend somewhat upon the thickness of the article to be molded, the particular curvature thereof and other factors.

To carry out the molding operation, sheets 11 are positioned on mold 10 and flexible member 13 is fixed to the longitudinal edges of base member 12. To prevent adhesion between the outer surface of the outer lamination and member 13 and between the inner lamination and the mold, these adjoining surfaces are rendered non-adhesive either by the interposition of a non-adhesive material, such as cellulose acetate, or by being free of adhesive. Base member 12 and flexible member 13 together with mold 10 and laminations 11, are then inserted into flexible bag 14 and the latter is closed and placed into tank 15, passage 16 being open to the atmosphere. A uniform pressure is then applied to the exterior of members 12, 13 by introducing a suitable fluid pressure medium into tank 14, the pressure being transmitted by said means to laminations 11 to bend and conform the latter to the mold shape. Heat may also be applied and the heat and pressure application is maintained until the adhesive has been activated. Thereafter the application of heat is discontinued and when the moldable material cools to approximately room temperature the pressure is relieved. The molded structure is then removed from the molding apparatus, making the latter available for the next operation.

During the bending of the laminations to the mold shape, flexible member 13 is stretched across the gap between the top of the mold and the edges of the base 12 and transmits a variable pressure to said laminations which lie in said gap. The resistance offered by member 13 to the pressure application tends to decrease the pressure at the projecting edges of the moldable material and causes a maximum pressure to exist at the top of the sharply curved portion C of the laminated material (Fig. 3). This presses the laminae into engagement with portion C of the mold before they engage side portions B of the mold and also prevents any buckling at portion C when the veneer is pressed to said side portions of the mold. The stretching of member 13 during the pressure application takes place progressively from portion C toward the edges of portions B and this relative displacement applies tangential friction forces to the laminations which increase progressively from the center to the edges. This also tends to keep portion C in close engagement with the mold. It is to be noted that at the lamination edges there is a minimum pressure resisting the expansion of the laminated material edgewise. Accordingly, any displacement occurs in this direction of least resistance further insuring the smooth engagement of the moldable material with the mold. The stretching of member 13 across gaps 19 also prevents said member or container 14 from catching between the edges of the laminations or between the laminations and the mold. At the end portions of the mold the member 13 is preferably so extensive as to permit folding over said end to prevent the outer container 14 from being forced into the gaps 19 before same are substantially closed by stretching of sheet 13 to the position shown in Fig. 3. Alternatively a suitable baffle or the like may be placed across the ends of the mold to prevent influx of the outer bag 14.

There is thus provided a novel method and apparatus whereby sheets of adhesively treated moldable material are pressed to the shape of a form and formed into a unitary structure by a single application of pressure. The apparatus and process are adaptable for molding and for veneering and protect the moldable material from being deformed and structurally weakened during molding. The laminations of moldable material do not have to be mechanically bent and secured to the mold before being subjected to the molding pressure, nor do any other complicated precautionary measures have to be taken prior to the molding operation.

It is to be expressly understood that the invention is not limited to the embodiments illustrated and described. For example, it will now be apparent to those skilled in the art that mold 10 may be detachable from base 12 and the latter may be permanently attached to sheet 13 which is provided in the latter case with an opening for insertion of the mold and moldable material. Various other changes may be made in the design and arrangement of parts without departing from the spirit and scope of the invention. For example, the mold, material and flexible cover may be positioned in a tank or container in which a bag is already positioned. With this method the pressure bag would be inflated and the fluid pressure thus transmitted to the mold and material. For a definition of the limits of the invention, reference will be had primarily to the appended claims.

What I claim is:

1. The method of molding laminated articles composed of a plurality of sheets separated from each other by a plastic bonding agent, upon a rigid mold having a substantial section of relatively sharp curvature, which comprises applying the article along only one narrow zone of contact to the mold and in contact with the mold at only one part of the curved section so that the article beyond said zone of contact to its free edge is out of contact with the mold, applying fluid pressure to the article operative initially to conform the article to the mold at only the initial narrow zone of contact while yieldably opposing the application of said pressure to said article beyond said zone to the free edge of the article so that said article beyond said zone to its free edge will remain out of contact with the mold, controlling the continued application of fluid pressure to said article while continuing to oppose yieldably the application of the fluid pressure to the article outside of the area thereof conformed to said mold thereby to act operatively and progressively upon successively adjacent areas of said article to conform the article progressively to the mold over successively adjacent areas and to maintain the article over its previously molded areas in conformity to the mold over corresponding areas, and continuing such controlled application of pressure until the article is contacted with and conformed to the mold over the entire specified curved section of the mold.

2. The method of molding laminated articles composed of a plurality of sheets separated from each other by a plastic bonding agent, upon a rigid mold having a section having an area of relatively sharp curvature progressively merging into areas of progressively lesser curvature which comprises applying the article along only one narrow zone of contact to the mold and in contact with the mold at only approximately its locus of greater curvature so that the article beyond said zone of contact to its free edge is out of contact with the mold, applying fluid pressure to the article operative initially to conform the article to the mold at only the initial narrow zone of contact while yieldably opposing the application of said pressure to said article beyond said zone to the free edge of the article to that said article beyond said zone to its free edge will remain out of contact with the mold, controlling the continued application of said fluid pressure to the article while continuing to oppose yieldably the application of said fluid pressure to the article outside of the area thereof conformed to said mold to act operatively and progressively on the article over successively adjacent areas to conform the article progressively to the mold over successively adjacent areas of progressively lesser curvature and to maintain the article over its previously molded areas in conformity to the mold over corresponding areas, and continuing such controlled application of pressure until the article is contacted with and conformed to the mold over the entire specified curved section of the mold.

EUGENE L. VIDAL.